United States Patent
Chernenkov

(10) Patent No.: US 12,450,236 B2
(45) Date of Patent: Oct. 21, 2025

(54) FULL FEATURE OBJECT IDENTITY QUERY ENGINE

(71) Applicant: Itur Intelligence LTD, Modi'in-Maccabim-Re'ut (IL)

(72) Inventor: Daniel Chernenkov, Kfar-Saba (IL)

(73) Assignee: Itur Intelligence LTD, Modi'in-Maccabim-Re'ut (IL)

( * ) Notice: Subject to any disclaimer, the term of this patent is extended or adjusted under 35 U.S.C. 154(b) by 0 days.

(21) Appl. No.: 18/418,278

(22) Filed: Jan. 21, 2024

(65) Prior Publication Data

US 2025/0238424 A1 Jul. 24, 2025

(51) Int. Cl.
| G06F 16/24 | (2019.01) |
| G06F 16/22 | (2019.01) |
| G06F 16/2455 | (2019.01) |
| G06F 16/951 | (2019.01) |

(52) U.S. Cl.
CPC .... G06F 16/24553 (2019.01); G06F 16/2264 (2019.01); G06F 16/951 (2019.01)

(58) Field of Classification Search
CPC .................................. G06F 16/24553
USPC ....................................... 707/713
See application file for complete search history.

(56) References Cited

U.S. PATENT DOCUMENTS

| 9,306,965 | B1 * | 4/2016 | Grossman | ............ H04L 63/1425 |
| 2020/0073953 | A1 * | 3/2020 | Kulkarni | ................ G06N 3/084 |
| 2021/0357378 | A1 * | 11/2021 | Urdiales | .................. G06N 3/08 |
| 2022/0164397 | A1 * | 5/2022 | Escalona | ................ G06F 40/20 |

FOREIGN PATENT DOCUMENTS

WO   WO-2004068300 A2 *  8/2004   ............. G06F 16/00

\* cited by examiner

Primary Examiner — Syling Yen

(57) ABSTRACT

A method of querying entities according to their identifying attributes, comprising accessing a repository storing a plurality of multi-dimensional feature vectors each uniquely representing a respective one of a plurality of entities and comprising a plurality of feature vectors each comprising a plurality of features relating to a respective one of a plurality of attributes of the respective entity, receiving one or more queries each defining a search for one or more of the plurality of entities, converting each query to one or more query vectors each comprising features relating to one or more search attributes defined by the respective query, comparing between the query vector(s) feature vectors of at least some of the multi-dimensional feature vectors, and outputting a response to the query(s) listing each entity represented by a multi-dimensional feature vector comprising one or more feature vectors estimated to match at least partially the query vector(s).

18 Claims, 4 Drawing Sheets

FULL FEATURE OBJECT IDENTITY QUERY ENGINE

BACKGROUND

The present invention, in some embodiments thereof, relates to querying entities according to their identifying attributes, and, more specifically, but not exclusively, to querying entities based on their representative multi-dimensional feature vectors created based their identifying attributes.

Identity (entity) management and connections establishment are fundamental issues in various domains including information systems, social networks, cybersecurity, and in fact are essential for most information technology based applications, systems, services, and/or platforms.

Data relating to entities such as, for example, individuals, companies, organizations, institutes, objects, physical and/or virtual assets, services, products, and/or the like may be typically expressed using non-measurable, and/or non-comparable terms. Moreover, the data relating to entities may originate from different and various data sources, may be created according to different data formats and/or the like.

Querying searching, and/or comparing such entities may be therefore a major challenge.

SUMMARY

According to a first aspect of the present invention there is provided a method of querying entities according to their identifying attributes, comprising using one or more processors for:

Accessing a repository storing a plurality of multi-dimensional feature vectors each uniquely representing a respective one of a plurality of entities. Each of the plurality of multi-dimensional feature vectors comprises a plurality of feature vectors. Each of the plurality of feature vectors comprises a plurality of features relating to a respective one of a plurality of attributes of the respective entity.

Receiving one or more queries each defining a search for one or more of the plurality of entities.

Converting the one or more queries to one or more query vectors each comprising features relating to one or more search attributes defined by the one or more queries.

Comparing between the one or more query vectors and one or more of the plurality of feature vectors of at least some of the plurality of multi-dimensional feature vectors.

Outputting a response to the one or more queries listing each of the plurality of entities represented by a multi-dimensional feature vector comprising one or more feature vectors estimated to match at least partially the one or more query vectors.

According to a second aspect of the present invention there is provided a system for querying entities according to their identifying attributes, comprising one or more processors adapted to execute a program code. The code comprising:

Program instructions to access a repository storing a plurality of multi-dimensional feature vectors each uniquely representing a respective one of a plurality of entities. Each of the plurality of multi-dimensional feature vectors comprises a plurality of feature vectors. Each of the plurality of feature vectors comprises a plurality of features relating to a respective one of a plurality of attributes of the respective entity.

Program instructions to receive one or more queries each defining a search of one or more of the plurality of entities.

Program instructions to convert the one or more queries to one or more query vectors each comprising features relating to one or more search attributed defined by the one or more queries.

Program instructions to compare between the one or more query vectors and one or more of the plurality of feature vectors of at least some of the plurality of multi-dimensional feature vectors.

Program instructions to output a response to the one or more queries listing each of the plurality of entities represented by a multi-dimensional feature vector comprising one or more feature vectors estimated to match at least partially the one or more query vectors.

In a further implementation form of the first, and/or second aspects, the response further comprises a list of each attribute of each listed entity whose feature vector matches at least partially the one or more query vectors.

In a further implementation form of the first, and/or second aspects, the response further comprises a score indicative of a probability and/or level of the match of each attribute of each listed entity with the one or more query vectors.

In an optional implementation form of the first, and/or second aspects, the one or more queries define a search for one or more potential relations between at least two of the plurality of entities.

In a further implementation form of the first, and/or second aspects, the comparing comprises computing a distance between the one or more query vectors and the one or more feature vectors of the at least some of the plurality of multi-dimensional feature vectors.

In a further implementation form of the first, and/or second aspects, the one or more feature vectors are estimated to match at least partially the one or more query vectors responsive to determining the distance does not exceed a certain threshold.

In an optional implementation form of the first, and/or second aspects, the distance is minimized between the one or more query vectors and at least some of the plurality of feature vectors of each of the at least some of the plurality of multi-dimensional feature vectors.

In an optional implementation form of the first, and/or second aspects, the one or more query vectors are dynamically adjusted according to one or more feature vectors of one or more multidimensional feature vector of one or more of the plurality of entities.

In a further implementation form of the first, and/or second aspects, the plurality of entities are members of a group comprising: an individual, a company, an organization, an institute, an object, a physical asset, and/or a virtual asset.

In a further implementation form of the first, and/or second aspects, the plurality of attributes of each of the plurality of entities are extracted from raw data obtained from one or more online resources.

In an optional implementation form of the first, and/or second aspects, one or more feature vectors of the multi-dimensional feature vector representing one or more of the plurality of entities are dynamically updated in real-time according to one or more updated attributes relating to the respective entity.

In a further implementation form of the first, and/or second aspects, the one or more updated attributes are detected based on real-time analysis of raw data relating to the respective entity.

In a further implementation form of the first, and/or second aspects, the real-time analysis of the raw data is done using one or more web crawlers adapted and deployed to monitor and analyze data published by one or more online resources.

In a further implementation form of the first, and/or second aspects, values of one or more of the plurality of attributes are normalized to establish a uniform scale across diverse data sets among the plurality of entities.

In a further implementation form of the first, and/or second aspects, normalizing the values comprises mapping the values of one or more numeric attributes of the plurality of attributes to a predefined range.

In a further implementation form of the first, and/or second aspects, normalizing the values comprises generating embeddings for the values of one or more non-numeric attributes of the plurality of attributes.

In an optional implementation form of the first, and/or second aspects, the plurality of feature vectors of the multi-dimensional feature vector representing one or more of the plurality of entities are analyzed to identify and discard overlapping features.

In a further implementation form of the first, and/or second aspects, a respective weight is assigned to each of the plurality of attributes of each of the plurality of entities, the respective weight is determined based on significance and/or contribution of the respective attribute to an overall profile of the respective entity.

In an optional implementation form of the first, and/or second aspects, the repository comprises relation mapping reflecting one or more relations between at least two of the at least some entities identified by comparing between the multi-dimensional feature vector representing at least some of the plurality of entities.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
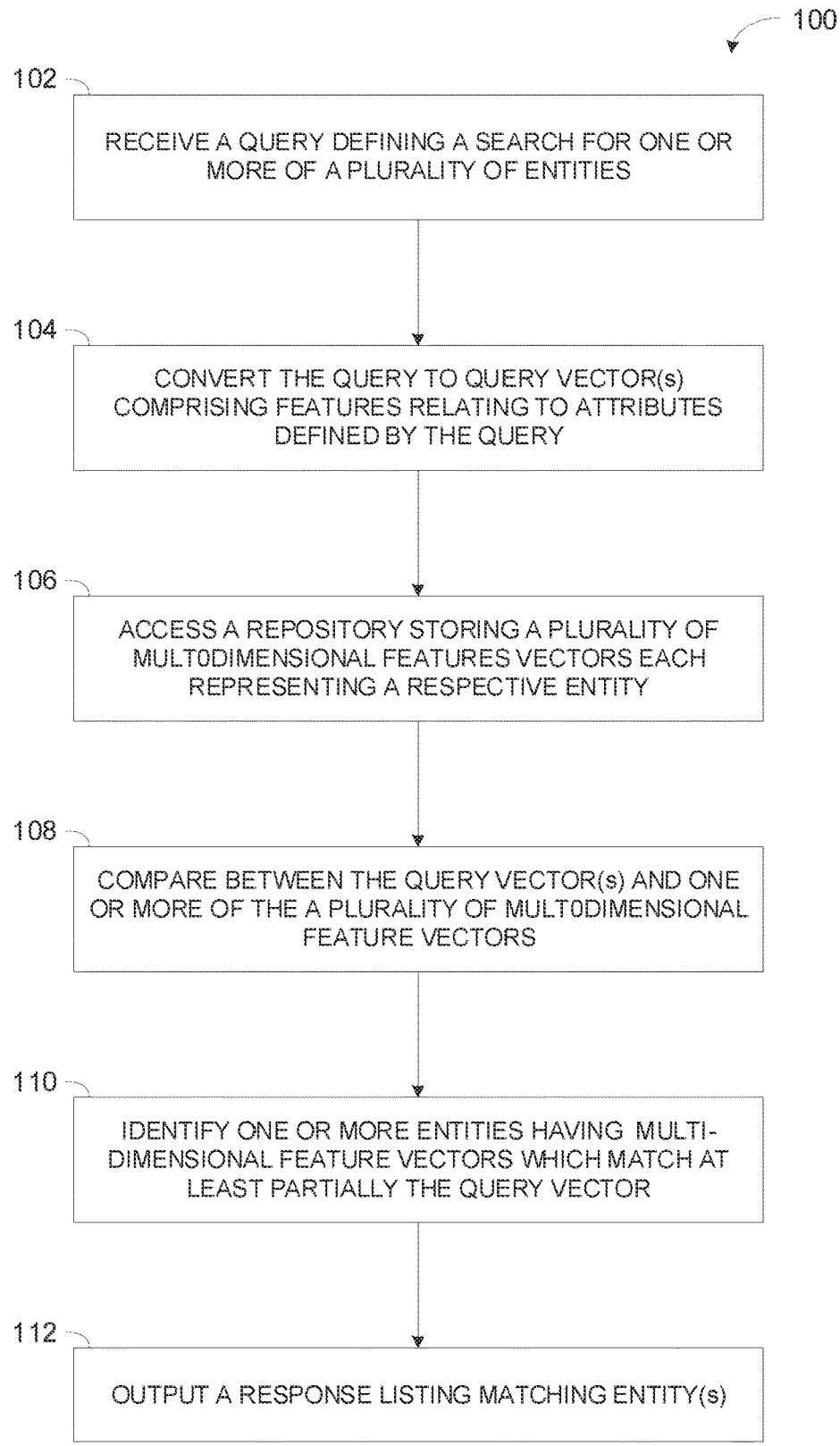
FIG. 1 is a flowchart of an exemplary process of querying entities based on their representative multi-dimensional feature vectors created based their identifying attributes, according to some embodiments of the present invention.

The present invention, in some embodiments thereof, relates to querying entities according to their identifying attributes, and, more specifically, but not exclusively, to querying entities based on their representative multi-dimensional feature vectors created based their identifying attributes.

According to some embodiments of the present invention, there are provided methods, systems, devices and computer software programs for querying entities, for example, an individual, a company, an organization, an institute, an object, a physical asset, a virtual asset, a service, a product, and/or the like based on their representative multi-dimensional feature vectors which are created based their identifying attributes.

Each query may define a search for one or more entities, interchangeably designated identities herein, which are identified and included in the search space and/or relations between multiple entities. as such, each query may define one or more target attribute searched for in the entities and one or more condition search criteria, for example, equal, NOT, AND, OR, XOR, and/or the like.

Responding to queries may serve one or more applications, for example, information technology based applications such as, for example, information systems, social networks, cybersecurity, data based research, financial inquires, criminal investigations, due-diligence procedures, and/or the like.

Each of the plurality of entities may be uniquely represented according to its attributes and attribute values. The attributes of the entities and their values which may be expressed in numeric terms, linguistic terms, symbolic terms, and/or the like and/or a combination thereof may be extracted, derived, identified and/or determined according to the raw data gathered online.

The attributes (values) of each of the entities may be analyzed and a respective multi-dimensional feature vector may be created to uniquely identify and represent the respective entity based on the entity's attributes.

In particular, each multi-dimensional feature vector representing a respective one of the entities may comprise a plurality of feature vectors where each of the plurality of feature vectors may relate to a respective and specific one of a plurality of attributes of the respective entity. As such, each feature vector may comprise a plurality of features relating to a respective attribute (values) of one of the entity's attributes.

Optionally, the multi-dimensional feature vectors representing one or more of the entities may be dynamically updated based on updated, new, and/or newly discovered raw data relating to the respective entity which is published by the online resources. Updating the multi-dimensional features vector representing the entities in real-time may ensure that these multi-dimensional feature vectors remain current and accurate, thereby improving the reliability and relevance of the query results.

Optionally, the values of one or more of the plurality of attributes of one or more of the plurality of entities may be normalized to establish a uniform scale and/or common reference across diverse data sets among the plurality of entities while maintaining the attributes' values proportional relationships.

Optionally, the multi-dimensional feature vectors representing one or more of the entities may be analyzed to identify and discard overlapping feature vectors and/or overlapping features.

Optionally, a respective weight may be assigned to each of the plurality of attributes of each of the plurality of entities to indicate significance of the respective attribute to an overall profile of the respective entity, for example, contribution, importance, influence, impact and/or like. Assigning weights to the attributes may increase efficiency and/or performance of the query process since the attributes may be evaluated according to their contribution, impact and/or relevancy to the application relying on the query system.

Optionally, relation mapping may be generated to reflect relations between multiple entities, i.e., between groups of two or more of the entities. The relations may be identified by comparing between the multi-dimensional feature vectors representing at least some of the entities. Moreover, identifying and documenting the relations between entities may include constructing one or more relational graphs comprising a plurality of nodes representing the entities and edges routed between the nodes to indicate the identified relationships. Matching algorithms and/or models employed to query and search for relations between the multi-dimensional feature vectors, optionally by analyzing the relational graph(s) may be therefore capable to meticulously examine and interpret interactions and connections between various entities. Creating and using such relational graphs may facilitate the ability to identify not only direct relationships between entities but indirect or hidden connections thus enabling the query system to identify subtle and nuanced relational dynamics between the entities.

Each query, which is typically expressed in linguistic and/or numeric terms may be converted to one or more query vectors comprising features relating to one or more attributes defined by the respective query.

The query vector(s) of each query may be then compared to the multi-dimensional feature vectors of at least some of the plurality of entities, specifically each query vector which relates to a certain attribute may be compared with a corresponding feature vector of the multi-dimensional feature vectors of the entities relating to the same attribute, to identify one or more entities represented by multi-dimensional feature vectors comprising feature vectors which match at least partially the query vector(s).

A response to each query may list each entity which matches at least partially the search query.

The response may optionally comprise a score indicative of a probability and/or level of the match between the entity and the query, specifically between each attribute of evaluated entities and the respective attribute defined in the query. The score may be computed based on correspondence, matching level, and/or matching scope of the features of the query vector and the features of the corresponding feature vector of the entity. For example, the score may be computed based on a distance, for example, Euclidean distance, Manhattan distance, and/or the like between each query vector and the corresponding feature vector of the evaluated entities.

Optionally, an aggregated score may be computed by aggregating the score computed for the match of a plurality of attributes defined in the query and corresponding attributes of the evaluated entities. For example, an overall aggregated distance may be computed by aggregating the distances computed for a plurality of feature vectors to their corresponding query vectors, for example, averaging, summing, combining, and/or the like.

Optionally, the response may further include relevant information derived from the comparison between the query vectors and the corresponding feature vectors of the multi-dimensional feature vectors representing the evaluated entities. As such, the response may include not merely a list of related entities, but also a detailed map of the relational network, highlighting the nature, strength, and dynamics of the connections.

Optionally, a match between the query vector and the corresponding feature vectors of the evaluated entities may be estimated, and/or determined based on one or more thresholds such that in case the distance between a query vector and a corresponding feature vector of a respective entity does not exceed a certain threshold, the respective entity may be estimated to match the query. Applying threshold(s) may ensure that the feature vectors falling within a defined proximity to the query vector, as dictated by the threshold, may be considered valid, thus enabling the identification of both exact and near matches.

Querying the entities (identities) which are represented by multidimensional feature vectors may present major benefits and advancement compared to existing data query methods and systems.

First, constructing a multi-dimensional feature vectors for each entity in which each attribute is represented via a separate feature vector may significantly increase granularity and finer grained representation of each entity provides thus efficiently capturing the unique characteristics of each entity which in turn may significantly improve querying, searching and/or matching performance, for example, accuracy, relevancy, reliability, consistency, robustness and/or the like.

Moreover, representing each attribute of an entity through a separate and independent feature vector may result in a highly modular structure of the a multi-dimensional feature vectors representing the entities. This modular design may significantly increase scalability since attributes may be adjusted, added, updated, and/or removed for each entity without disrupting other feature vectors of the multi-dimensional feature vector representing the respective entity.

Furthermore, allocating a disparate feature vector for each attribute of each entity in the entity's associated multi-dimensional feature vector may enable application of efficient similarity measures and comparison algorithms for identifying entities and/or entities inter-relation matching the query vectors representing the queries.

In addition, establishing a uniform scale for the attributes across all entities, specifically across their multi-dimensional feature vectors may significantly increase efficiency and/or performance of the query, search and match process since the normalization may align disparate attribute values to a common reference framework, enabling consistent and accurate comparisons among the entities. Normalizing the attributes may also reduce computing resources, specifically real-time computing resources since no pre-processing may be required to align the attributes among the entities feature vectors in real-time during the query processing.

Also, processing the feature vectors to eliminate redundancies and/or overlapping features, attributes, and/or the like may significantly reduce computing resources, for example, processing resources, processing time, storage resources, and/or the like since processing of redundant data may be reduced and potentially completely eliminated. Removing redundancies in the feature vectors may also increase performance of the query, search and match process since potential ambiguities are removed.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, which is a flowchart of an exemplary process of querying entities based on their representative multi-dimensional feature vectors created based their identifying attributes, according to some embodiments of the present invention.

An exemplary process 100 may be executed to respond to search queries aiming to search for matching entities among a plurality of entities, interchangeably designated identities, and/or for relations between entities based on attributes of the entities.

The queries may be generated to serve one or more applications, for example, information systems, social networks, cybersecurity, data based research, financial inquires, criminal investigations, due-diligence procedures, and/or the like.

Each of the plurality of entities, interchangeably designated identities herein, may be uniquely represented by a respective features vector, specifically a multi-dimensional feature vector comprising a plurality of feature vectors each relating to a respective one of a plurality of attributes of the respective entity and thus comprising a plurality of features relating to the respective attribute.

The attributes of each entity may be identified, gathered, and/or determined based on analysis of raw data relating to the respective entity which is obtained from one or more online resources, for example, online media, online services, public services, databases, and/or the like accessible via one or more networks, specifically the internet. The attributes of the entities which may be expressed in numeric terms, linguistic terms, symbolic terms, and/or the like and/or a combination thereof may be extracted from the raw data gathered online.

Moreover, the multi-dimensional feature vectors representing one or more of the entities may be dynamically updated based on updated, new, and/or newly discovered raw data relating to the respective entity.

Each query, which is typically expressed in linguistic terms may be converted to one or more query vectors comprising a plurality of features relating to one or more attributes defined by the respective query.

The query vector(s) of each query may be then compared to the multi-dimensional feature vectors of at least some of the plurality of entities to identify one or more entities represented by multi-dimensional feature vectors which match at least partially the query vector(s).

A response to the query may therefore list each entity which matches at least partially the search query.

Figure 2:
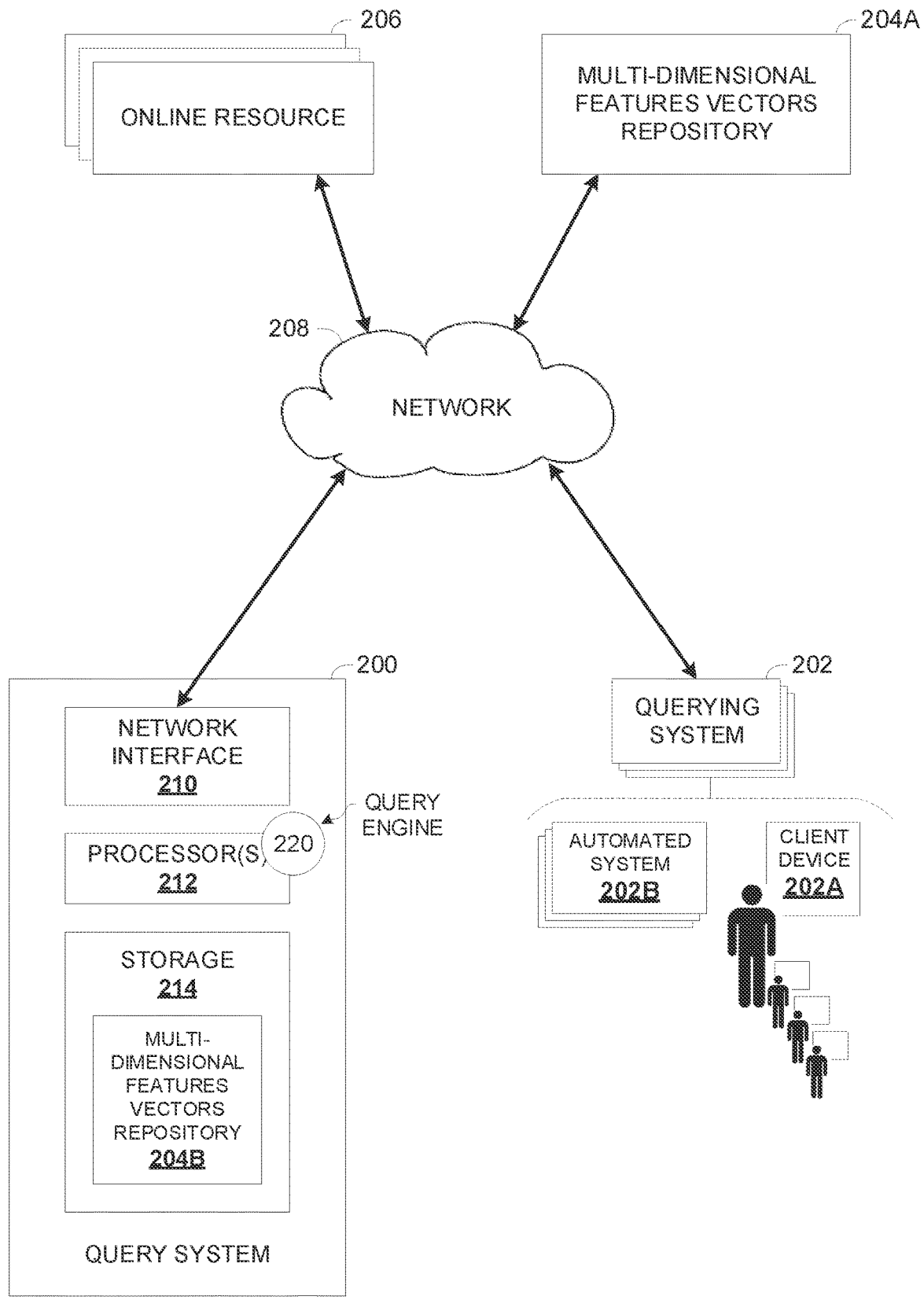
FIG. 2 is a schematic illustration of an exemplary system for querying entities based on their representative multi-dimensional feature vectors created based their identifying attributes, according to some embodiments of the present invention.

Reference is also made to FIG. 2, which is a schematic illustration of an exemplary system for querying entities based on their representative multi-dimensional feature vectors created based their identifying attributes, according to some embodiments of the present invention.

An exemplary query system 200 may be deployed and adapted to receive queries from one or more querying systems 202 defining one or more search attributes for entities and respond to each query with a list of entities matching the search attributes defined by the respective query.

Moreover, one or more queries may optionally define one or more relation attributes between multiple entities and the query system 200 may respond with a list of related entities having relations, connections, and/or associations matching the relation attributes defined by the respective query.

The entities may include practically any entity, object, asset, service, and/or item for which data may be collected online, for example, an individual, a company, an organization, an institute, an object, a physical asset, a virtual asset, a service, a product, and/or the like.

The querying systems 202 may include automated and/or user oriented devices, systems, apparatuses, and/or services. For example, the querying systems 202 may include one or more client devices 202A operated, managed, and/or otherwise used by one or more users to generate search queries and transmit them to the query system 200. In another example, the querying systems 202 may include one or more automated systems 202B, for example, a system, a service, a platform, and/or the like adapted to generate queries automatically for one or more applications.

The query system 200, for example, a server, a computing node, a cluster of computing nodes and/or the like may include a network interface 210, a processor(s) 212, and a storage 214 for storing data and/or code (program store).

The network interface 210 may include one or more interfaces, ports, and/or links, implemented in hardware, software, and/or combination thereof, for connecting to a network 208 comprising one or more wired and/or wireless networks, for example, a Local Area Network (LAN), a Wireless LAN (WLAN, e.g., Wi-Fi), a Wide Area Network (WAN), a Municipal Area Network (MAN), a cellular network, the internet, and/or the like.

Via the network interface 210, the query system 200 may communicate over the network 208 with one or more remote network resources. For example, the query system 200 may communicate over the network 208 with one or more of the querying systems 202 to receive queries and respond to the queries with responses listing entities which match at least partially the query. In another example, the query system 200 may communicate over the network 208 with a repository 204, specifically a remote repository 204A storing multi-dimensional feature vectors each uniquely representing a respective one of a plurality of entities mapped in the repository 204.

The processor(s) 212, homogenous or heterogeneous, may include one or more processing nodes arranged for parallel processing, as clusters and/or as one or more multi core processor(s).

The storage 214 may include one or more non-transitory memory devices, for example, persistent devices such as, for example, a ROM, a Flash array, a hard drive, an SSD, a magnetic disk and/or the like, and/or volatile devices such as, for example, a RAM device, a cache memory and/or the like. The storage 214 may further comprise one or more local and/or remote network storage resources, for example, a storage server, a Network Attached Storage (NAS), a network drive, a cloud storage service and/or the like accessible via the network interface 210.

Optionally, the storage 214 may store the multi-dimensional feature vectors repository 204 and/or part thereof, specifically a local repository 204B storing the multi-dimensional feature vectors representing the plurality of mapped entities.

The multi-dimensional feature vectors repository 204 may be therefore utilized through the remote multi-dimensional feature vectors repository 204A, the local multi-dimensional feature vectors repository 204B and/or a combination thereof. For brevity, regardless of its exact implementation, the multi-dimensional feature vectors repository is addressed as the multi-dimensional feature vectors repository 204.

The processor(s) 212 may execute one or more software modules, for example, a process, a script, an application, an agent, a utility, a tool, an Operating System (OS), a service, a plug-in, an add-on, and/or the like each comprising a plurality of program instructions stored in a non-transitory medium (program store) such as the storage 214 and executed by one or more processors such as the processor(s) 212.

Optionally, the processor(s) 212 further include, utilize and/or apply one or more hardware elements available to the query system 200, for example, a circuit, a component, an Integrated Circuit (IC), an Application Specific Integrated Circuit (ASIC), a Field Programmable Gate Array (FPGA), a Digital Signals Processor (DSP), a Graphic Processing Unit (GPU), an Artificial Intelligence (AI) accelerator, and/or the like.

The processor(s) 212 may therefore execute one or more functional modules utilized by one or more software modules, one or more of the hardware modules and/or a combination thereof. For example, the processor(s) 212 may execute a query engine 220 adapted for executing the process 100 to receive one or more queries each defining a search for one or more of the plurality of entities and/or relations between them and respond to the respective query with a list of entity(s) matching at least partially the search defined by the respective query.

Optionally, the query system 200, specifically, the query engine 220 may be utilized by one or more cloud computing services, platforms and/or infrastructures such as, for example, Infrastructure as a Service (IaaS), Platform as a Service (PaaS), Software as a Service (SaaS) and/or the like provided by one or more vendors, for example, Google Cloud Platform (GCP), Microsoft Azure, Amazon Web Service (AWS) and Elastic Compute Cloud (EC2), IBM Cloud, and/or the like.

Each of the plurality of multi-dimensional feature vectors uniquely representing a respective one of the entities mapped in the multi-dimensional features vector repository 204 may comprises a plurality of feature vectors relating to a plurality of attributes of the receptive entity.

In particular, each feature vector of each multi-dimensional feature representing a respective entity may relate to a specific one of the plurality of attributes of the respective entity. This means that each feature vector of each multi-dimensional features vector representing a respective one of the entities may comprise a plurality of features relating to a respective one of a plurality of attributes of the respective entity.

The attributes of each entity may span a wide range of attributes, parameters, characteristics, and/or the like which are representative, indicative, and/or associated with the respective entity.

The attributes may comprise static attributes or at least infrequently changing attributes such as, for example, personal information, registration data, ownership information, and/or the like. However, the attributes may comprise dynamically changing attributes such as, for example, travel patterns of individuals, vehicles and/or the like, browsing history of individuals, schedules of individuals, trading patterns of assets, and/or the like.

For example, the attributes of the entities may include an entity type attribute, for example, an individual, a company, an organization, an institute, an object, a physical asset, a virtual asset, a service, a product, and/or the like. The entity type attribute may further include additional data values, such as, for example, a type sub-group, a type sub-category, an activity domain of the domain, and/or the like.

In another example, assuming one or more of the entities are individuals, the attributes of such entities may include, for example, personal information such as, for example, name, age, gender, residence, occupation, education, relatives, and/or the like. In another example, attributes of such individuals entities may include financial attributes, for example, capital, property, investments, holdings, and/or the like. In another example, attributes of such individuals entities may include travel attributes, for example, travel patterns, travel locations, travel times, and/or the like.

In another example, attributes of entities which are commercial companies, may include, for example, resources attributes such as, for example, employees, assets, sites, capital, cash flow, investments, debts, and/or the like. In another example, the attributes of commercial companies entities may include commercial attributes, for example, contracts, relations with other entities, marketing efforts and campaigns, ownership structure, members of board of directors, and/or the like. In another example, the attributes of commercial companies entities may include internet browsing attributes, for example, browsing patterns of employees, sites frequently visited by employees, and/or the like.

In another example, attributes of entities which are physical and/or virtual items and/or objects, for example, a vehicle, a real-estate asset, a security bond, and/or the like may include, for example, ownership attributes such as, for example, owner, period of ownership, ownership history, recordation of ownership, and/or the like. In another example, the attributes of such item or object entities may include status, functional and/or technical attributes, for example, operational condition, capabilities, functional parameters, dimensions, applicability, intended use, and/or the like. In another example, the attributes of mobile assets, for example, vehicles, mobile devices (e.g., mobile phones, tablets, wearable devices, etc.) may mobility attributes, for example, movement patterns, overall travelled distance, distance traveled per time period, and/or the like.

The attributes of the entities may be expressed in numeric terms, and/or non-numeric terms, for example, linguistic terms, symbolic terms, and/or the like and moreover, optionally, by a combination thereof. For example, quantities attributes such as, for example, dimensions, distances, fiscal values, timing values, and/or the like may be expressed in numeric values, a range of values, and/or the like. In another example, descriptive attributes, for example, personal information, commercial data, inter entities relations, and/or the like may be expressed in linguistic values and/or a combination of linguistic and numeric values.

Optionally, the values of one or more of the plurality of attributes of one or more of the plurality of entities may be normalized to establish a uniform scale across diverse data sets among the plurality of entities, i.e., to create a common reference for identical and/or similar attributes of different entities. Normalization of the attributes' values may be done using one or more methods, techniques, and/or algorithms known in the art for converting different ranges of values into standardized formats typically depending on the nature of the data, i.e., the target attributes, for example, min-max scaling, z-score normalization, feature scaling, and/or the like.

For example, normalizing the values of one or more numeric attributes may comprise mapping the values the respective numeric attribute to a predefined range. For example, assuming the attributes of a first attribute of a first entity are expressed in a first range, e.g., 0-100, while the attributes of a second attribute of a second entity, potentially a similar attribute, are expressed in a second range, e.g., 50-80. In such case, the values of the first and second attributes may be mapped to a common predefined range, for example, 0-1. The mapping process may be executed using one or more methods, for example, linear and/or non-linear transformations to fit the numeric values within a specific predefined range, for example, 0 to 1 or −1 to 1. Such transformation may ensure that the attributes' values maintain their proportional relationships while being adapted to a common scale which may be more suitable for the subsequent analysis and comparison.

In another example, normalizing the values may comprise generating embeddings for the values of one or more non-numeric attributes of the plurality of attributes of one or more of the entities. the embeddings, for example, textual embeddings, symbolic embeddings, contextual embeddings, and/or the like may be created using one or more methods, techniques, and/or models. For example, textual embeddings may be created using one or more techniques such as, for example, one-hot encoding, label encoding, and/or the like. In another example, textual embeddings may be created using one or more word embedding models such as, for example, Word2Vec, GloVe, and/or the like. In another example, contextual embeddings may be created for one or more non-numeric attributes using one or more Machine Learning (ML) models adapted and trained to create embeddings for features extracted from non-numeric attributes values. Such embeddings may convert categorical, textual, or other non-numeric data features into a numerical format that may be effectively processed and analyzed to support high efficiency query processing.

The normalization may therefore align disparate attribute values to a common reference framework, enabling consistent and accurate comparisons among the entities.

The plurality of attributes of each of the target entities which are mapped in the repository 204 may be extracted from raw data analyzed to identify, and/or determine the attributes of each entity. The raw data may be obtained from one or more online resources 206, for example, digital media, social media, online services, public services, databases, and/or the like which are accessible via the networks 208.

The raw data analyzed to identify the attributes of the entities may be collected periodically, continuously, and/or on-demand. For example, the online resource(s) 206 may be explored periodically, for example, once an hour, once a day, once a week, once a month, and/or the like where the traversing frequency may typically depend on the application for which the query system 200 and the query engine 220 are applied.

Optionally, exploration and analysis of the raw data may be done in real-time such that added data, new data, and/or newly published data which relate to one or more of the entities may be immediately identified in real-time and processed to extract one or more attributes of the receptive entities.

Optionally, the real-time exploration and collection of the raw data may be done using one or more web crawlers, as known in the art, which may be adapted and deployed to monitor and analyze data published by one or more of the online resource(s) 206. The web crawlers may be designed, adapted, and/or programmed to navigate through the internet (web), identify and collect updated information relevant to the entities, and feed this information for immediate processing. The web crawlers may be adaptable and configurable to target specific types of data, online resources, and/or sources, thus ensuring a focused and efficient data collection.

As described herein before, each of the multi-dimensional features vector representing the entities mapped in the multi-dimensional features vector repository 204 may comprise a plurality of feature vectors each relating to a respective on of the plurality of attributes of the respective entity. Each feature vector may therefore include a plurality of features extracted from, and/or relating to the respective attribute.

The features of each feature vector may be trivial features mapping values of the respective attribute. However, the features of one or more of the feature vectors of one or more of the multi-dimensional features vectors may optionally include nuances, contextual features, embeddings, and/or the like which may be derived, extrapolated, estimated, and/or otherwise determined for the respective attribute of the respective entity.

The feature vectors may include features of one or more feature types. The features may include, for example, numerical features such as for example, an age, a salary, a dimension, and/or the like having numeric values, for example, integer, floating, and/or the like within one or more ranges. In another example, the features may include categorical features each having a limited number of values, for example, a gender (male, female, X), a color (red, blue, green, etc.), and/or the like. In another example, the features may include ordinal features which are similar to categorical features but have an ordering, for example, an increasing order, a describing order, and/or the like. In another example, the features may include binary features which are a special case of categorical features having only two categories, for example, yes/no. true/false, 0/1, and/or the like, for examples, a smoker (yes, no), has subscription (true, false), and/or the like. In another example, the features may include text (textual) features which are expressed via textual, linguistic, and/or symbolic terms.

The feature vectors may be created using one or more methods, techniques, and/or models as known in the art. For example, one or more of the feature vectors of one or more of the multi-dimensional features vectors may be created using one or more feature extraction models such as, for example, neural networks such as, for example, autoencoder adapted and trained to identify key data features, Principal Component Analysis (PCA) adapted to reduce dimensionality of the datasets analyzed to extract the features, Natural Language Processing based models adapted to extract features from textual and/or linguistic attributes, and/or the like.

Since the attributes of one or more of the entities may be updated and/or adjusted in real-time, the multi-dimensional features vector representing these entities may be also dynamically updated accordingly in real-time. This means that one or more of the plurality of feature vectors of the multi-dimensional features vector representing one or more of the entities may be updated, for example, adjusted, added, removed, and/or otherwise manipulated according to the updated attributes of the respective entity. Updating the multi-dimensional features vector representing the entities in real-time may ensure that these multi-dimensional feature vectors remain current and accurate, thereby improving the reliability and relevance of the query results.

For example, assuming that based on analysis of updated raw data collected in real-time, it is identified that one or more values of a certain attribute of a certain entity are updated and/or adjusted. In such case, the feature vector relating to the certain attribute in the multi-dimension feature vector representing the respective entity may be adjusted to include features extracted from the updated value(s) of the respective attribute.

In another example, assuming that based on analysis of updated raw data collected in real-time, it is identified that a certain attribute which was not previously associated with a certain entity is added for the respective entity. In such case, a new feature vector relating to the new attribute may be created based on features extracted from, and/or relating to the new attribute and included in the multi-dimension feature vector representing the respective entity.

In another example, assuming that based on analysis of updated raw data collected in real-time, it is identified that a certain attribute which was previously associated with a certain entity is removed for the respective entity. In such case, the feature vector relating to the removed new attribute may be discarded, for example, removed, deleted, nullified and/or the like from the multi-dimension feature vector representing the respective entity.

Optionally, the plurality of feature vectors of the multi-dimensional feature vectors representing one or more of the entities may be analyzed to identify and discard overlapping features. Since the attributes of one or more entities may be extracted from multiple raw data sets obtained from different sources, for example, different online resources 206, and/or raw datasets having different format, and/or the like, such attributes may overlap at least partially with each other, meaning that the attributes may be similar or even identical attributes but may be interpreted as different attributes. as result, multiple feature vectors created based on features extracted from these potentially overlapping attributes may also overlap with one another.

The feature vectors of one or more of the multi-dimensional feature vectors stored in the repository 204 may be therefore analyzed to identify such overlapping feature vectors and discard redundant vectors. For example, assuming that two different feature vectors of a certain multi-dimensional feature vector representing a certain entity are determined to be identical, one of the feature vectors may be discarded and removed from the certain multi-dimensional feature vector. In another example, assuming that two different feature vectors of a certain multi-dimensional feature vector representing a certain entity are determined to relate to the same attribute of the certain entity but do not include identical feature sets. In such case, one of the two feature vectors may be adjusted to include a combined feature set combining non-overlapping features of the two feature vectors, and the other feature vector may be discarded and removed from the certain multi-dimensional feature vector.

Analyzing the feature vectors to identify such overlaps may be done using one or more methods, techniques, algorithms, and/or models as known in the art, for example, PCA, Independent Component Analysis (ICA), and/or the like adapted to detect redundancy in data, specifically among feature vectors of one or more of the multi-dimensional feature vectors each representing a respective entity. Identifying and removing such overlapping feature vectors may yield a more streamlined and distinct representation of each entity, enhancing the overall efficiency and accuracy of the query system 200.

Optionally, a respective weight may be assigned to each of the plurality of attributes of each of the plurality of entities. The respective weight of each attribute may be determined based on significance of the respective attribute to an overall profile of the respective entity, for example, contribution, importance, influence, impact and/or the like. For example, attributes which have high defining contribution to representation of a respective entity may be assigned a large weight while attributes having low defining contribution to the representation of the respective entity may be assigned a small weight.

Moreover, the weight of one or more of the attributes of the entities may be assigned according to a type, objective, and/or parameters of the application utilizing the query system 200. For example, assuming the query system 200 is employed by an application aiming to identify relations between entities, for example, between individuals and vehicles. In such case, a high weight may be assigned to an owner attribute of the vehicle entities while a significantly low weight may be assigned to a color attribute of the vehicle entities. In another example, assuming the query system 200 is employed by an application executed to compute statistics and/or distributions of vehicle's exterior color in one or more market segments and/or geographical regions. In such case, a high weight may be assigned to the color attribute of the vehicle entities while a significantly low weight may be assigned to the owner attribute.

The weights may be assigned using one or more methods, techniques, and/or algorithms, for example, entropy weighting, gini index, customized scoring algorithms and/or the like which are adapted to assess and/or determine the significance of the attributes and assign weights accordingly. Optionally, a default weight may be initially assigned to each of the attributes which may be optionally adjusted for one or more of the attributes according to the significance of the respective attribute.

The weights assigned to the attributes may propagate, transfer and/or be inherited by the feature vectors such that each feature vector of each multi-dimensional feature vector representing each of the entities may be associated with the weight assigned to its respective attribute, i.e., the attribute from which the respective feature vector was derived.

Assigning weights to the attributes may ensure that more influential attributes may have a greater impact on the feature vector comparison process. This weighted approach may allow for a nuanced and precise analysis of the entities' representation, reflecting the true importance of each attribute in the context of the data set, i.e., of the multi-dimensional feature vector.

The weights assigned to the attributes may propagate, transfer and/or be inherited by the feature vectors such that each feature vector of each multi-dimensional feature vector representing each of the entities may be associated with the weight assigned to its respective attribute, i.e., the attribute from which the respective feature vector was derived.

Optionally, the multi-dimensional feature vectors repository 204 may further comprises relation mapping reflecting one or more relations between multiple entities, i.e., between two or more of at least some of the entities. The relations may be identified by comparing between the multi-dimensional feature vectors representing at least some entities. The relations between entities may be identified based on comparative analysis conducted using one or more methods, techniques, algorithms, and/or models, for example, advanced graph theory algorithms, network analysis techniques, and/or the like adapted to analyze the multi-dimensional feature vectors representing the entities and identify relations between them based on similarities and/or differences of their respective multi-dimensional feature vectors.

The relation mapping may be recorded in the repository 204 using one or more data structures, for example, a graph, a file, a list, a table, a database and/or the like associating entities with one another according to their relation(s), optionally with description of the relation.

While the relation mapping may be embedded in the multi-dimensional feature vectors representing the entities, for example, as one or more relational attributes, via metadata, via a separate data segment, and/or the like, the relation mapping may be constructed in graphical form to accurately depict relations between entities in a clear, concise, and intuitive form.

For example, identifying the relations between entities may involve constructing one or more relational graphs comprising a plurality of nodes representing the entities and edges between the nodes which symbolize the identified relationships.

Such relational graph(s) may be created using one or more methods and/or algorithms, for example, community detection, shortest path calculation, network centrality measures, and/or the like employed to discern and visualize the intricate web of relations and associations between entities.

Creating and using such relational graphs may enable not only identification of direct relationships between entities but may also uncover indirect or hidden connections, providing a comprehensive understanding of the relational dynamics between the entities. The output of this relation mapping process may therefore include a detailed map, optionally represented visually, which may highlight both the strength and type or nature of the relations and connections, thus offering valuable insights into complex entity interactions.

The repository 204 may be managed, for example, created, maintained, and/or updated by one or more systems, services, applications, and/or a combination thereof which may be deployed and adapted to conduct the processes, actions, and/or operations described herein before with respect to the multi-dimensional feature vectors representing the entities including their creation, update, relation mapping and/or the like. For example, in some embodiments the query system 200, optionally the query engine 220, may manage the multi-dimensional feature vectors repository 204. In other embodiments, the multi-dimensional feature vectors repository 204 may be managed by one or more systems, services, and/or applications disparate and independent of the query system 200. In another example, the repository 204 may be managed jointly by the query system 200 and one or more other systems, services, and/or applications.

For brevity, the process 100 is described for processing a single query defining a search for entities and/or relations between entities. This, however, should not be construed as limiting since as may be apparent to a person skilled in the art, the process 100 may be repeated, duplicated, and/or scaled for processing a plurality of queries each defining a search for entities and/or relations between entities.

As shown at 102, the process 100 starts with the query engine 220 receiving a query defining a search for one or more of the plurality of entities mapped in the repository 204. As such, the query may specify one or more attributes and/or criteria for searching one or more entities.

Optionally, the query may define a search for one or more potential relations between multiple entities, i.e., two or more of the entities.

The query which may define search attributes and search criteria for entities and/or relations between entities having attributes that comply with the search criteria may range from simple attribute lookups through complex, multi-attribute searches to relational mapping between entities.

The search criteria may define one or more logical, arithmetic, and/or other operations as known in the art for search queries, for example, equal, not, AND, OR, XOR, and/or the like.

The query may be received from one of the querying systems 202, for example, a client device 202A operated by a user and may thus include user defined search attributes and criteria or, an automated system 202B adapted to automatically create the query and define the search attributes and criteria.

As shown at 104, the query engine 220 may convert the received query to one or more query vectors comprising features relating to one or more of the search attributes defined by the query.

The query engine 220 may apply similar methods, techniques, algorithms, and/or models as applied to create the multi-dimensional feature vectors representing the entities as described herein before such that the format of the query vector(s) is similar to that of the feature vectors of the multi-dimensional feature vectors stored in the repository 204.

In particular, the query engine 220 may analyze the search attributes and criteria defined by the query to identify attributes, matching rules, comparison terms, and/or the like, and create one or more query vectors comprising features extracted from the query for the identified attribute(s).

For example, assuming the query defines a simple search for entities characterized by a certain value of a certain attribute. In such case, based on analysis of the query, the query engine 220 may create a single query vector comprising features extracted from the query with respect to the single attribute. For example, assuming a certain received query defines a search for individuals entities who own a certain type of real-estate assets in a certain geographical region. In such case, the query engine 220 may create a single query vector comprising features relating to the real-estate type, the geographical region, individual owners, and/or the like.

In another example, assuming the query defines a plurality of search attributes and criteria relating to multiple entity attributes. In such case, based on analysis of the query, the query engine 220 may create a plurality of query vectors each relating to a respective attribute defined by the query and comprising features extracted from the query with respect to the respective attribute. For example, assuming a certain received query defines a search for individuals entities who own both a certain type of real-estate assets in a certain geographical region and who are above an age of 50. In such case, the query engine 220 may create multiple query vectors each relating to a respective one of the attributes defined by the query, for example, a first query vector comprising features relating to the real-estate type, the geographical region, individual owners, and/or the like, and a second query vector comprising features relating to the age of individual real-estate owners.

As shown at 106, the query engine 220 may access the repository 204 storing the plurality of multi-dimensional feature vectors each uniquely representing a respective one of the plurality of entities mapped in the repository 204.

As described herein before the multi-dimensional feature vectors repository 204 may be utilized locally at the query system 200, for example, in storage 214, remotely in one or more servers, cloud services, and/or the like accessible via the network 208, and/or a combination therefore, i.e., a repository 204 distributed between the remote repository 204A and the local repository 204B.

In particular, the query engine 220 may access the multi-dimensional feature vectors repository 204 to search for entities represented by associated multi-dimensional feature vectors comprising one or more feature vectors which may match the query vector(s). For example, assuming the received query is converted to a single query vector comprising features relating to a single certain attribute, the query engine 220 may traverse the multi-dimensional feature vectors stored in the repository 204 to search for multi-dimensional feature vectors comprising a feature vector relating to the certain attribute. In another example, assuming the received query is converted to multiple query vectors, for example, three query vectors each comprising features relating to a respective one of the three attributes. In such case, the query engine 220 may traverse the repository 204 to search for multi-dimensional feature vectors comprising corresponding feature vectors relating to all of the three attributes.

As shown at 108, the query engine 220 may compare between the one or more query vectors and the corresponding feature vectors of at least some of the plurality of multi-dimensional feature vectors representing at least some of the entities, designated evaluated entities herein after.

In particular, the query engine 220 may compare between at least some of the plurality of multi-dimensional feature vectors which comprise such corresponding feature vectors, i.e., feature vectors relating to the attributes defined by the query and expressed accordingly in the query vectors. For brevity, these at least some multi-dimensional feature vectors are designated evaluated multi-dimensional feature vectors herein after.

The query engine 220 may compare between the query vector(s) and the corresponding feature vectors of the evaluated multi-dimensional feature vectors by comparing between the features (values) of the query vector(s) and the features of the corresponding feature vector(s) of each of the evaluated multi-dimensional feature vectors.

As shown at 110, the query engine 220 may analyze the multi-dimensional feature vectors of the evaluated entities to identify one or more entities having multi-dimensional feature vectors which comprise corresponding feature vectors matching at least partially the query vector(s).

The query engine 220 may apply a layered analysis approach, where each entity's multi-dimensional feature vector may be cross-referenced against the query vector(s) using one or more matching algorithms and/or models, for example, an ML model (e.g., neural network, etc.) trained to estimate match probabilities, a statistical classifier, a similarity calculator, and/or the like, collectively designated matching algorithm herein after.

The matching algorithm may be designed, configured, and/or adapted to identify direct matches between the features of the query vector(s) and the corresponding feature vector(s). However, the matching algorithm may be further adapted to detect nuanced correlations, associations, and partial alignments within the multi-dimensional feature space. The matching algorithm may be also adapted to identify relations between the entities, specifically with respect to the attributes defined by the query and its corresponding query vectors, based on analysis of the multi-dimensional feature vectors of these entities.

The matching algorithm employed by the query engine 220 may be further designed, adapted, and/or trained, to meticulously examine and interpret interactions and connections between various entities. The matching algorithm may analyze the multi-dimensional feature vectors of each entity to identify and elucidate potential relationships, whether direct relations or indirect, explicit or inferred. The analysis may include, but is not limited to, analyzing commonalities in attributes, correlating event participation, cross-referencing communication patterns and/or the like. This capability of the query engine 220 may provide profound insights into complex entity interrelations, thus significantly enhancing the value of the data analysis for applications ranging from marketing strategies to security surveillance for example.

The query engine 220 may further compute a score indicative of a probability and/or level of the match between each attribute of the at least some evaluated entities and the respective attribute defined in the query. In other words, the score may indicate to what level in a certain scale, for example, 0-1, the attribute of each evaluated entity matches, complies, corresponds, and/or satisfies the same attribute defined by the query and the search criteria defined for this attribute.

Similarly, in case, the query defines a search for one or more potential relations between entities, the score computed by the query engine 220 may be indicative of a probability and/or level of the match between each relation defined in the query and a respective potential relation estimated between two or more entities estimated to relate to each other according to the defined relation.

In particular, the query engine 220, using the matching algorithm applied to analyze the features of the corresponding feature vector(s) of the evaluated multi-dimensional feature vectors compared to the query vector(s), may compute the score based on comparison and matching between the features of the query vector relating to a certain attribute and the features of the corresponding feature vector relating to the same attribute in each evaluated multi-dimensional feature vector.

Optionally, the query engine 220 may compute an aggregated score aggregating the score computed for the match between a plurality of attributes defined in the query and corresponding attributes of the evaluated entities. The query engine 220 may compute the aggregated score by applying one or more arithmetic and/or other operations, for example, sum, average, linear distribution, non-linear distribution, and/or the like over a plurality of scores indicative of the probability and/or level of the match between each query vector and the corresponding feature vector relating in each of the evaluated multi-dimensional feature vectors.

The query engine 220 may apply one or more methods, techniques, and/or algorithms for computing the score. For example, the query engine 220 may compute a distance between each query vector and the corresponding feature vector, i.e., the feature vector relating to the same attribute, of each of the evaluated multi-dimensional feature vectors.

The query engine 220 may apply one or more methods, techniques, and/or algorithms for computing the distance, for example, k-nearest neighbors (k-NN) algorithm, optionally augmented with dimensionality reduction techniques such as PCA, t-Distributed Stochastic Neighbor Embedding (t-SNE), and/or the like to effectively manage the high-dimensional space. The k-NN algorithm may be particularly adept at identifying the closest feature vectors to the query vector, based on one or more chosen distance metric, for example, Euclidean distance, Manhattan distance, and/or the like thus ensuring accurate, precise, reliable and/or relevant data comparison and matching.

Optionally, the query engine 220 may estimate, determine and/or identify entities which at least partially match the search defined by the query based on the distance computed between the query vector(s) and the corresponding feature vector(s) of each evaluated multi-dimensional feature vector. For example, the query engine 220 may apply one or more thresholds, and estimate that a corresponding feature vector matches the query vector responsive to determining that the distance does not exceed a certain threshold. This means that in case the distance between the query vector and the corresponding feature vector of a respective evaluated multi-dimensional feature vector does not exceed the threshold, the query engine 220 may estimate that the entity represented by the respective multi-dimensional feature vector may match at least partially the search criteria and attributes defined by the query.

The query engine 220 may apply one or more thresholds for estimating the match between each query vector and the corresponding feature vectors. For example, assuming multiple attributes are normalized and mapped to a common range, for example, 0-1, the query engine 220 may apply a common threshold, for example, 0.05, 0.1, 0.15, and/or the like. In another example, the query engine 220 may apply a plurality of different thresholds for a plurality of different attributes which may be mapped to different ranges, spaces, and/or domains which may include numeric ranges, and/or non-numeric spaces, for example, textual, linguistic, symbolic, and/or the like.

The threshold(s) may be determined using one or more methods such as, for example, the silhouette method, statistical analysis, and/or the like applied to optimize the sensitivity of the match, which may be expressed through the match probability and/or level which may be determined according to the distance with respect to the threshold(s). In another example, one or more Support Vector Machine (SVM) classifiers may be employed to ascertain the boundary of the threshold thus enhancing the specificity of the matching process.

Applying threshold(s) may ensure that the feature vectors falling within a defined proximity to the query vector, as dictated by the threshold, may be considered valid, thus enabling the identification of both exact and near matches.

Optionally, the query engine 220 may attempt to minimize the distance between one or more of the query vectors and the corresponding feature vectors of each of the evaluated multi-dimensional feature vectors and estimate the match of the entities with the search query according to the minimized distance.

In particular, in case multiple query vectors are created based on the received query, the query engine 220 may minimize an overall distance aggregating, for example, combining, summing, averaging, and/or the like, a plurality of distances between the multiple query vectors and their corresponding feature vectors of the evaluated multi-dimensional feature vectors.

Based on the overall aggregated distance, the query engine 220 may determine a match of each evaluated multi-dimensional feature vector with the query vectors, and hence a match of the respective entity represented by the respective multi-dimensional feature vector with the query. For example, assuming four query vectors are created for a certain received query. After computing the distance between each query vector and its corresponding feature vector of each of the evaluated multi-dimensional feature vectors, the query engine 220 may estimate, and/or determine a match of each evaluated multi-dimensional feature vector based on an aggregated distance aggregating the four distances computed for each of the corresponding feature vectors of the respective evaluated multi-dimensional feature vector with respect to one of the four query vectors.

Moreover, the query engine 220 may apply a global threshold for estimating the match of each evaluated multi-dimensional feature vector with the query vectors, such that responsive to detecting that the overall distance does not exceed the global threshold, the query engine 220 may estimate that the evaluated multi-dimensional feature vector and hence the evaluated entity matches the search query.

Optionally, the query engine 220 may dynamically adjust one or more of the query vectors according to one or more feature vector of one or more of multi-dimensional feature vectors of one or more of entities mapped in the repository 204, in particular, one or more of the evaluated multi-dimensional feature vectors to efficiently bridge over gaps and/or discrepancies in missing data components and/or format.

For example, assuming that a certain attribute is defined differently in the query compared to definition of the same attribute used to create the respective feature vectors of the multi-dimensional feature vectors stored in the repository 204, for example, a different range, a different feature space, and/or the like. In such case, the query engine 220 may dynamically adjust a query vector relating to the certain attribute to include features extracted, computed, and/or defined according to the attribute definition used for the multi-dimensional feature vectors stored in the repository 204. The query engine 220 may apply one or more methods, algorithms, and/or models for identifying discrepancies between the query vectors and corresponding feature vectors stored in the repository 204, for example, an ML model, and/or the like designed to dynamically adjust the query vector's features (parameters) based on corresponding feature vectors of entities mapped in the repository 204. Optionally, the query optimization process may involve continuous refinement of the vector model employed for both the multi-dimensional feature vectors and the query vectors to accurately interpret and correlate diverse entity related data elements, such as, for example, location events, email exchanges, and other pertinent anomalies. The iterative adjustment may enable the query engine 220 to discern subtle connections and patterns within the entity data thus enhancing query match performance, for example, match prediction accuracy, reliability, robustness, consistency, and/or the like, in real-time scenarios.

As shown at 112, the query engine 220 may output a response to query which lists each of the plurality of entities represented by a multi-dimensional feature vector comprising one or more feature vectors estimated to match at least partially the query vector.

For example, the query engine 220 may transmit the response via the network 208 to the querying system 202 which submitted the query. In another example, the query engine 220 may transmit the response via the network 208, optionally in conjunction with the query, to one or more remote resources, for example, a server, a cloud service, and/or the like adapted to monitor, log, and/or store query and response traffic. In another example, the query engine 220 may locally store the output response, optionally in conjunction with the query, for example, in storage 214.

As describe herein before, the listed entities may include entities having attribute(s) which match at least partially the attributes defined by the query, specifically with respect to the search criteria defined for the query attribute(s). However, in case the query is directed to search for relations between entities, the listed entities may include related entities which satisfy at least partially the search criteria and attributes defined by the query.

The response output by the query engine 220 may further comprises a list of each attribute of each listed entity whose feature vector matches at least partially a respective one of the query vector(s). The response may also include the score computed to indicate the match between each query vector and the corresponding feature vector of the listed entity.

For example, assuming a certain received query defined three attributes for the search. In such case, the query engine 220 may create three query vectors each relating to one of the three attributes defined by the certain query. After searching the repository 204 to identify multi-dimensional feature vectors which may potentially match the query vectors, and based on the comparison between the query vectors and the corresponding feature vectors, the query engine 220 may compute the score for each matching feature vector and may create and/or adjust the response to list, for each entity, each of the three attributes defined by the query that are found in the respective entity and a score indicative of the probability and/or level of match of the respective attribute.

Optionally, the response may further include relevant information derived by the query engine 220 from the comparison between the query vectors and the corresponding feature vectors of the multi-dimensional feature vectors representing the evaluated entities.

The response provided by the query engine 220 may therefore include not merely a list of related entities, but also a detailed map of the relational network, highlighting the nature, strength, and dynamics of the connections.

Figure 3:
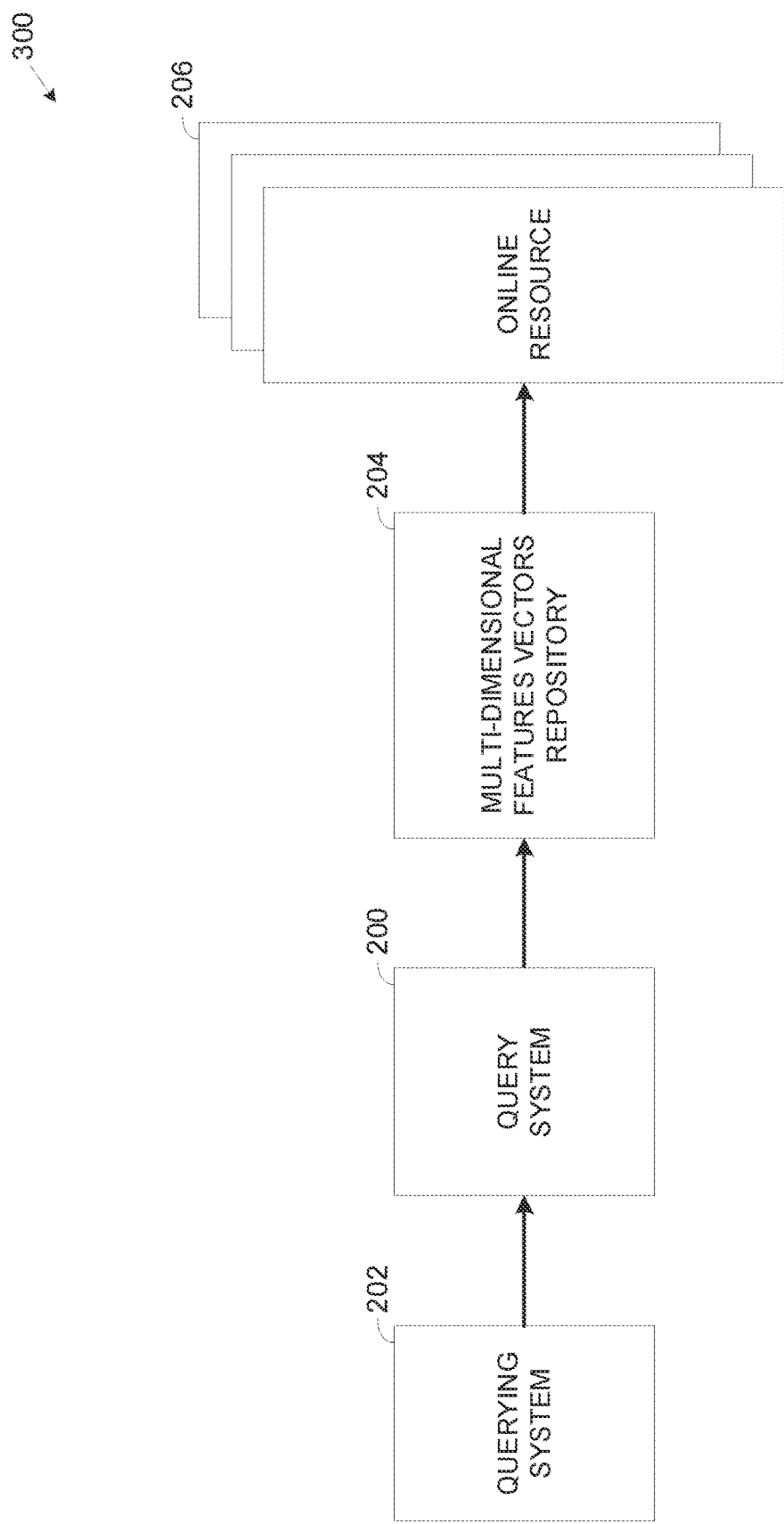
FIG. 3 is a schematic illustration of an exemplary sequence for querying entities based on their representative multi-dimensional feature vectors, according to some embodiments of the present invention.

Reference is ow made to FIG. 3, which is a schematic illustration of an exemplary sequence for querying entities based on their representative multi-dimensional feature vectors, according to some embodiments of the present invention.

An exemplary sequence 300 exhibits a flow of one or more queries each defining a search for one or more entities and/or relations between entities based on their attributes as described in the process 100.

As seen, the query may be received by a query system such as the query system 200 from a querying system such as the querying system 202 as described in step 102 of the process 100. The query system 200 executing a query engine such as the query engine 220 may convert the query to one or more query vectors as described in step 104 of the process 100 such that each query vector may relate to a respective attribute of one or more of the entities.

The query engine 220 may access a repository such as the repository 204 storing a plurality of multi-dimensional feature vectors each uniquely representing a respective one of a plurality of entities as described in step 106 of the process 100.

As described herein before, each of the plurality of multi-dimensional feature vectors representing a respective entity comprises a plurality of feature vectors each comprising a plurality of features relating to a respective one of a plurality of attributes of the respective entity. As also described herein before, the plurality of feature vectors of the multi-dimensional feature vectors may be created for attributes of the entities extracted from raw data collected from one or more online resources such as the online resources 206.

The query engine 220 may compare between the query vector(s) and corresponding feature vector(s) of at least some of the multi-dimensional feature vectors representing entities estimated to match the query. In particular, the query engine 220 may compare between features (values) of each query vector and the features (values) of the corresponding feature vector relating to the same attribute expressed by the respective query vector.

Based on the comparison, the query engine 220 may identify one or kore entities having multi-dimensional feature vectors which match at least partially the query vector(s) as described in step 110 of the process 100.

Finally, the query engine 220 may output a response to the query which lists the entity(s) determined to match at least partially the search defined by the query as described in step 112 of the process 100.

Figure 4:
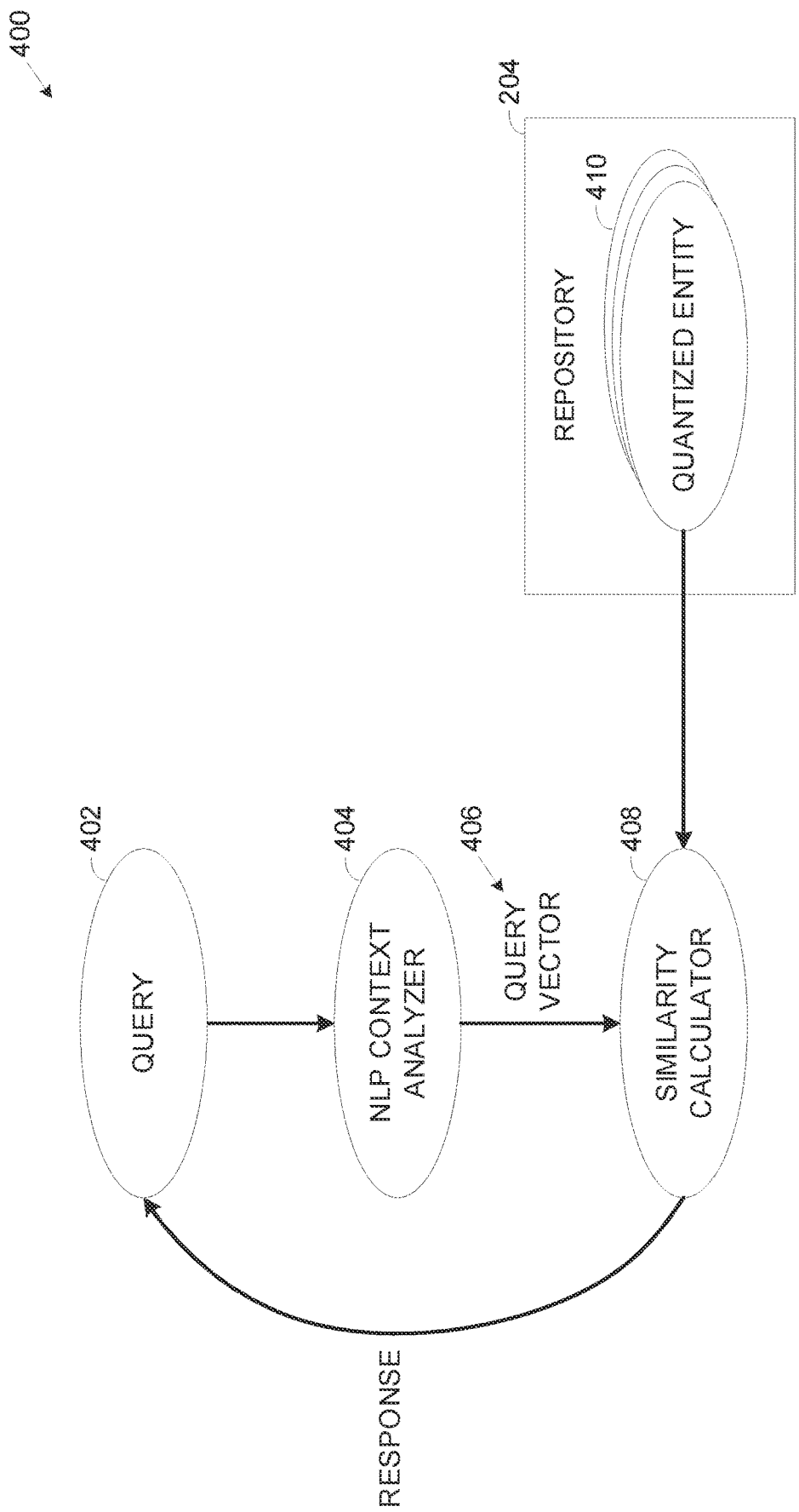
FIG. 4 is a schematic illustration of an exemplary sequence of responding to a query with matching entities identified by comparing a query vector derived from the query with representative multi-dimensional feature vectors of a plurality of entities, according to some embodiments of the present invention.

Reference is also made to FIG. 4, which is a schematic illustration of an exemplary sequence of responding to a query with matching entities identified by comparing a query vector derived from the query with representative multi-dimensional feature vectors of a plurality of entities, according to some embodiments of the present invention.

As seen in exemplary sequence 400, a query 402 may be received by the query engine 220 from one of the querying systems 202. The query engine 220 may apply one or more analysis tools, algorithms, engines, models, and/or the like, for example, an NLP context analyzer 404 to analyze the receive query and generate a query vector 406 based on the features identified, derived, and/or extracted from the received query as described in step 104 of the process 100.

The query vector 406 may be fed to one or more comparison tools, algorithms, engines, models, and/or the like, for example, a similarity calculator 408 employed by the query engine 220 to compare the query vector 406 with one or more multi-dimensional feature vectors 408 representing a plurality of entities which are stored in a repository such as the multi-dimensional feature vectors repository 204 as described in step 108 of the process 100.

The query engine 220 may then respond to the query with a response listing one or more entities which are represented by multi-dimensional feature vectors 408 estimated by the similarity calculator 408 to match at least partially the query vector 406 as described in steps 110 and 112 of the process 100.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms query terms and search criteria are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of querying entities according to their identifying attributes, comprising:
using at least one processor for:
accessing a repository stored and maintained in one or more non-transitory memory devices, said repository storing a plurality of multi-dimensional feature vectors each uniquely representing a respective one of a plurality of entities, wherein said plurality of entities comprises entities of a plurality of different types of entities, wherein said plurality of different types of entities comprises two or more types which are members of a group consisting of: an individual, a company, an organization, an institute, an object, a physical asset, and a virtual asset, wherein an entity of a certain type of entities is characterized by a different set of plurality of attributes, wherein each of the plurality of multi-dimensional feature vectors comprises a plurality of feature vectors each corresponding to a respective one of the identifying attributes of the respective entity;
dynamically updating in real-time at least one feature vector of the multi-dimensional feature vector representing at least one of the plurality of entities according to at least one updated attribute relating to the respective entity;
receiving at least one query defining a search for at least one of the plurality of entities;
converting the at least one query to at least one query vector comprising features relating to at least one search attribute defined by the at least one query;

comparing between the at least one query vector and at least one of the plurality of feature vectors of at least some of the plurality of multi-dimensional feature vectors; and outputting a response to the at least one query listing the plurality of entities represented by a multi-dimensional feature vector comprising at least one feature vector estimated to match at least partially the at least one query vector.

2. The method of claim 1, wherein the response further comprises a list of each attribute of each listed entity whose feature vector matches at least partially the at least one query vector.

3. The method of claim 2, wherein the response further comprises a score indicative of a probability and/or level of the match of each attribute of each listed entity with the at least one query vector.

4. The method of claim 1, further comprising the at least one query defines a search for at least one potential relation between at least two of the plurality of entities.

5. The method of claim 1, wherein the comparing comprises computing a distance between the at least one query vector and the at least one feature vector of the at least some of the plurality of multi-dimensional feature vectors.

6. The method of claim 5, wherein the at least one feature vector is estimated to match at least partially the at least one query vector responsive to determining the distance does not exceed a certain threshold.

7. The method of claim 5, further comprises minimizing the distance between the at least one query vector and at least some of the plurality of feature vectors of each of the at least some of the plurality of multi-dimensional feature vectors.

8. The method of claim 7, further comprising dynamically adjusting the at least one query vector according to at least one feature vector of at least one multidimensional feature vector of at least one of the plurality of entities.

9. The method of claim 1, wherein the plurality of attributes of each of the plurality of entities are extracted from raw data obtained from at least one online resource.

10. The method of claim 1, wherein the at least one updated attribute is detected based on real-time analysis of raw data relating to the respective entity.

11. The method of claim 10, wherein the real-time analysis of the raw data is done using at least one web crawler adapted and deployed to monitor and analyze data published by at least one online resource.

12. The method of claim 1, wherein values of at least one of the plurality of attributes are normalized to establish a uniform scale across diverse data sets among the plurality of entities.

13. The method of claim 12, wherein normalizing the values comprises mapping the values of at least one numeric attribute of the plurality of attributes to a predefined range.

14. The method of claim 12, wherein normalizing the values comprises generating embeddings for the values of at least one non-numeric attribute of the plurality of attributes.

15. The method of claim 1, further comprising analyzing the plurality of feature vectors of the multi-dimensional feature vector representing at least one of the plurality of entities to identify and discard overlapping features.

16. The method of claim 1, wherein a respective weight is assigned to each of the plurality of attributes of each of the plurality of entities, the respective weight is determined based on significance and/or contribution of the respective attribute to an overall profile of the respective entity.

17. The method of claim 1, wherein the repository further comprises relation mapping reflecting at least one relation between at least two of the at least some entities identified by comparing between the multi-dimensional feature vector representing at least some of the plurality of entities.

18. A system for querying entities according to their identifying attributes, comprising:

at least one processor adapted to execute a program code, the code comprising:

program instructions to access a repository stored and maintained in one or more non-transitory memory devices, said repository storing a plurality of multi-dimensional feature vectors each uniquely representing a respective one of a plurality of entities, wherein said plurality of entities comprises entities of a plurality of different types of entities, wherein said plurality of different types of entities comprises two or more types which are members of a group consisting of: an individual, a company, an organization, an institute, an object, a physical asset, and a virtual asset, wherein an entity of a certain type of entities is characterized by a different set of plurality of attributes, wherein each of the plurality of multi-dimensional feature vectors comprises a plurality of feature vectors each corresponding to a respective one of the identifying attributes of the respective entity;

program instructions to dynamically update in real-time at least one feature vector of the multi-dimensional feature vector representing at least one of the plurality of entities according to at least one updated attribute relating to the respective entity;

program instructions to receive at least one query defining a search of at least one of the plurality of entities;

program instructions to convert the at least one query to at least one query vector comprising features relating to at least one search attribute defined by the at least one query;

program instructions to compare between the at least one query vector and at least one of the plurality of feature vectors of at least some of the plurality of multi-dimensional feature vectors; and program instructions to output a response to the at least one query listing the plurality of entities represented by a multi-dimensional feature vector comprising at least one feature vector estimated to match at least partially the at least one query vector.

* * * * *